United States Patent
Barman

(10) Patent No.: US 9,817,556 B2
(45) Date of Patent: Nov. 14, 2017

(54) FEDERATED COMMENTING FOR DIGITAL CONTENT

(71) Applicant: Roovy, Inc., San Diego, CA (US)

(72) Inventor: Touradj Barman, San Diego, CA (US)

(73) Assignee: ROOVY, INC., San Diego, CA (US)

( * ) Notice: Subject to any disclaimer, the term of this patent is extended or adjusted under 35 U.S.C. 154(b) by 0 days.

(21) Appl. No.: 14/141,277

(22) Filed: Dec. 26, 2013

(65) Prior Publication Data

US 2014/0181694 A1 Jun. 26, 2014

Related U.S. Application Data

(60) Provisional application No. 61/848,089, filed on Dec. 26, 2012.

(51) Int. Cl.
*G06F 3/0482* (2013.01)
*G06Q 50/00* (2012.01)
*G06F 3/0484* (2013.01)
*H04W 4/20* (2009.01)
*H04L 29/08* (2006.01)

(52) U.S. Cl.
CPC .......... *G06F 3/0484* (2013.01); *G06Q 50/01* (2013.01); *H04L 67/02* (2013.01); *H04W 4/206* (2013.01)

(58) Field of Classification Search
CPC ......... H04L 67/10; H04L 51/32; H04L 67/22; G06Q 50/01; H04W 4/206; G06F 17/30828
See application file for complete search history.

(56) References Cited

U.S. PATENT DOCUMENTS

| | | | |
|---|---|---|---|
| 8,825,759 B1 * | 9/2014 | Jackson | H04L 67/02 705/14.69 |
| 8,943,047 B1 * | 1/2015 | Carpio | G06Q 10/06 707/723 |
| 2007/0150299 A1 * | 6/2007 | Flory | 705/1 |
| 2010/0030722 A1 * | 2/2010 | Goodson | G06Q 30/02 706/54 |
| 2010/0241968 A1 * | 9/2010 | Tarara et al. | 715/751 |
| 2010/0251094 A1 * | 9/2010 | Holm et al. | 715/230 |
| 2011/0173316 A1 * | 7/2011 | Moromisato et al. | 709/224 |

(Continued)

OTHER PUBLICATIONS

Kim, U.S. Appl. No. 61/657,594, filed Jun. 8, 2012, titled "Add Social Comment Keeping Photo Context", 3 pgs.

*Primary Examiner* — Tadeese Hailu

(57) ABSTRACT

Systems and methods are disclosed to share comments regarding a content item presented among via different Internet services. For example, a method for sharing comments among Internet services may include presenting a first content item to a plurality of users over the Internet via a first Internet service; receiving at the first Internet service a first comment that is related to the first content item and is received from a user through the Internet; presenting the first comment in conjunction with the first content item via the first Internet service; sending the first comment from the first Internet service to a second Internet service; receiving at the first Internet service a second comment from the second Internet service, wherein the second comment is different than the first comment; and presenting the second comment in conjunction with the first content item via the first Internet service.

20 Claims, 17 Drawing Sheets

(56) References Cited

U.S. PATENT DOCUMENTS

| | | | |
|---|---|---|---|
| 2011/0196927 A1* | 8/2011 | Vance | G06Q 30/02 709/204 |
| 2011/0258556 A1* | 10/2011 | Kiciman et al. | 715/751 |
| 2011/0276396 A1* | 11/2011 | Rathod | 705/14.49 |
| 2011/0279851 A1* | 11/2011 | Berger et al. | 358/1.15 |
| 2011/0320373 A1* | 12/2011 | Lee | G06Q 50/01 705/319 |
| 2012/0023534 A1* | 1/2012 | Dasilva et al. | 725/109 |
| 2012/0110429 A1* | 5/2012 | Tzonis et al. | 715/230 |
| 2012/0144311 A1* | 6/2012 | Yeh et al. | 715/744 |
| 2012/0151383 A1* | 6/2012 | Kazan et al. | 715/753 |
| 2012/0158753 A1* | 6/2012 | He et al. | 707/752 |
| 2012/0215798 A1* | 8/2012 | Burris et al. | 707/755 |
| 2012/0236201 A1* | 9/2012 | Larsen et al. | 348/468 |
| 2012/0278428 A1* | 11/2012 | Harrison | H04N 21/2665 709/217 |
| 2012/0284343 A1* | 11/2012 | Lee et al. | 709/206 |
| 2012/0331496 A1* | 12/2012 | Copertino et al. | 725/14 |
| 2013/0031208 A1* | 1/2013 | Linton et al. | 709/217 |
| 2013/0066981 A1* | 3/2013 | Park et al. | 709/206 |
| 2013/0104070 A1* | 4/2013 | Blake et al. | 715/777 |
| 2013/0110978 A1* | 5/2013 | Gordon | H04N 21/2665 709/218 |
| 2013/0191861 A1* | 7/2013 | Sasaki et al. | 725/32 |
| 2013/0204940 A1* | 8/2013 | Kinsel | G06Q 30/02 709/204 |
| 2013/0275857 A1* | 10/2013 | Norwood et al. | 715/234 |
| 2013/0297691 A1* | 11/2013 | Collins et al. | 709/204 |
| 2013/0328932 A1* | 12/2013 | Kim et al. | 345/636 |
| 2015/0032824 A1* | 1/2015 | Kumar | H04L 12/5825 709/206 |

* cited by examiner

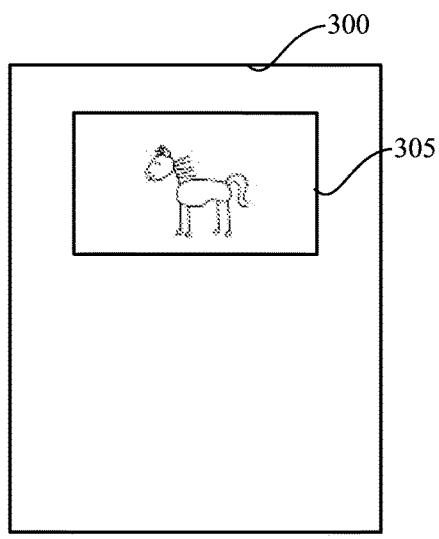
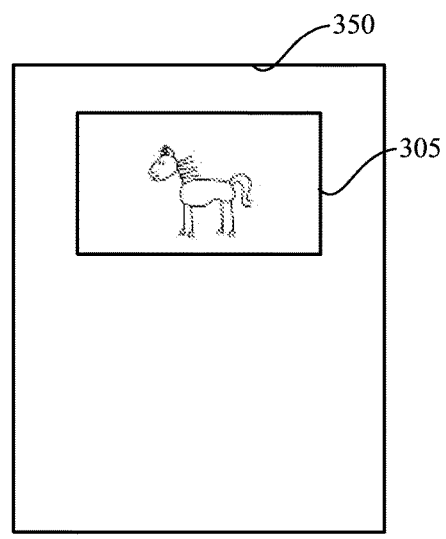
*Figure 3A*  *Figure 3B*

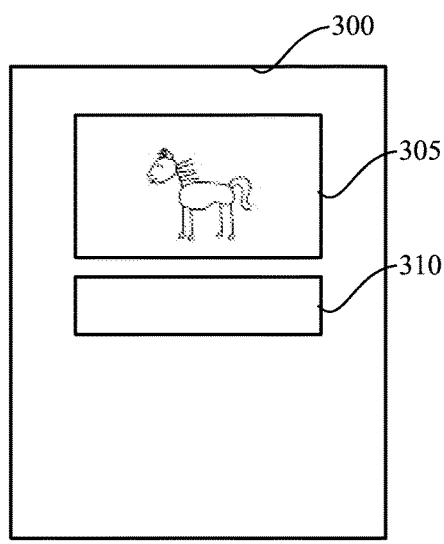 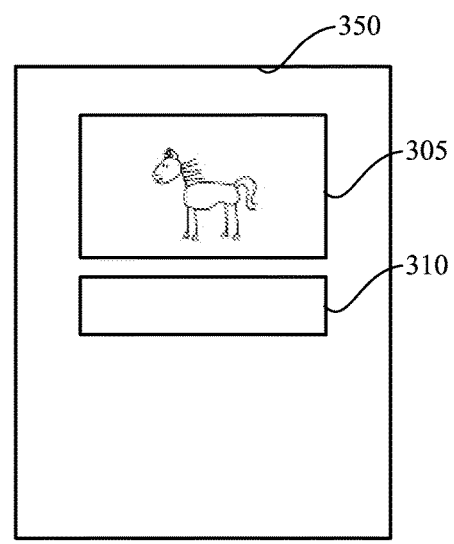
*Figure 5A*  *Figure 5B*

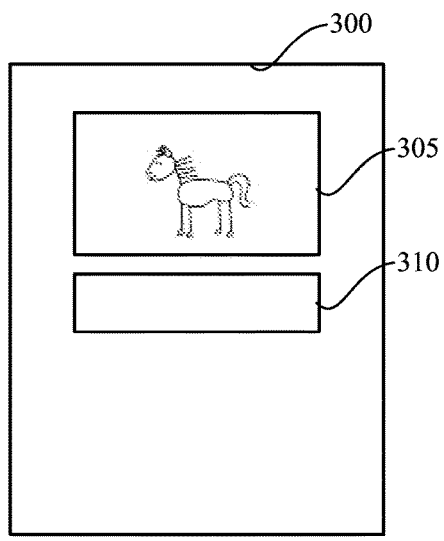 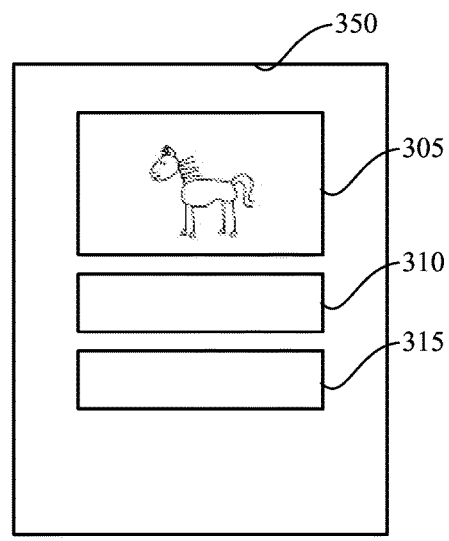
*Figure 6A*          *Figure 6B*

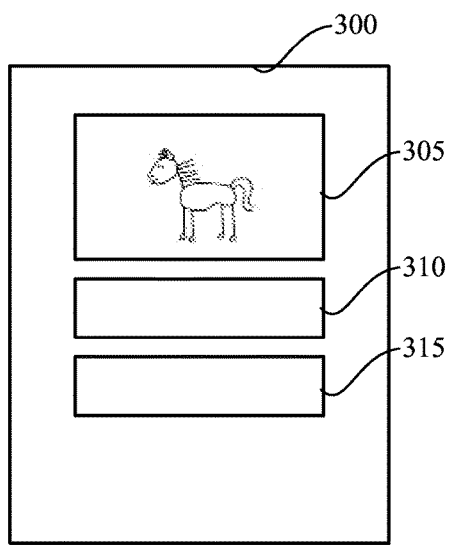 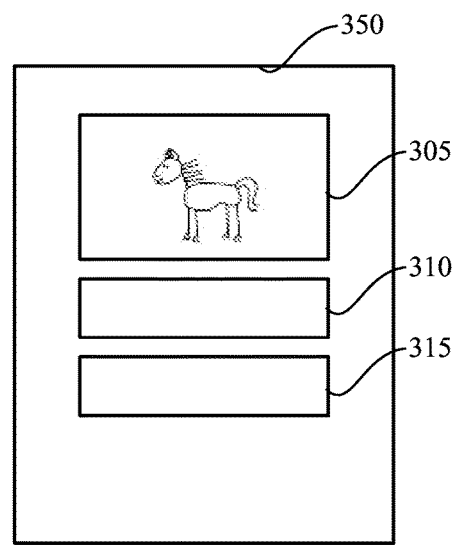
*Figure 7A*  *Figure 7B*

US 9,817,556 B2

FEDERATED COMMENTING FOR DIGITAL CONTENT

FIELD

This disclosure relates generally to federated comments for digital content.

BACKGROUND

The Internet has provided a forum for people to share content items and their views on such content. These forums include webpages, articles, social networks, blogs, etc., among others. For instance, images or videos can be shared with others using social network. Thoughts and opinions can be shared using blogs and articles. The Internet allows these content items to be viewed and consumed by users around the world. And, with the advent of smartphones and tablets, content can now be shared while users are on the go. This has also provided forums for individuals to comment on content that has been published.

SUMMARY

Embodiments of the invention include a method for sharing comments among Internet services. The method may include receiving, at a second Internet service 111, a link to a first content item hosted at a first Internet service 110; presenting the first content item to one or more users via the second Internet service 111; sending a request from the second Internet service 111 to the first Internet service 110 for comments associated with the first content item; receiving at the second Internet service 111 at least a first comment associated with the first content item; presenting at least the first comment via the second Internet service 111; receiving a second comment via the second Internet service 111; and presenting the second comment via the second Internet service 111.

Embodiments of the invention include a method for sharing comments among Internet services may include presenting a first content item to a plurality of users over the Internet via a first Internet service 110; receiving at the first Internet service 110 a first comment that is related to the first content item and is received from a user through the Internet; presenting the first comment in conjunction with the first content item via the first Internet service 110; sending the first comment from the first Internet service 110 to a second Internet service 111; receiving at the first Internet service 110 a second comment from a third Internet service; and presenting the second comment in conjunction with the first content item via the first Internet service 110. In some embodiments, the second comment may be different than the first comment.

In some embodiments, the method may also include receiving a third comment from a fourth Internet service. In some embodiments, the third comment may be different than the first comment and the second comment.

Embodiments of the invention also include a method for managing federated comments, the method comprising receiving a first message from a first Internet service 110; storing the first comment in conjunction with the first content item in a database at a federated commenting server; determining that the first content item has been presented on a second Internet service 111; sending the first comment to the second Internet service 111; receiving a second message from the second Internet service 111; storing the second comment in conjunction with the first content item; and sending the second content item to the first Internet service 110. In some embodiments, the first message may indicate a first content item presented by the first Internet service 110 and includes a first comment received from a user in conjunction with the first content item. In some embodiments, the second message may indicate the first content item and includes a second comment received from a user in conjunction with the second content item.

Embodiments of the invention also include a computer program product comprising a non-transitory computer-readable medium embodying code executable by a computing system. The code may include presenting a first content item to a plurality of users over the Internet via a first Internet service 110; receiving at the first Internet service 110 a first comment that is related to the first content item and is received from a user through the Internet; presenting the first comment in conjunction with the first content item via the first Internet service 110; sending the first comment from the first Internet service 110 to a second Internet service 111; receiving at the first Internet service 110 a second comment from a third Internet service; and presenting the second comment in conjunction with the first content item via the first Internet service 110. In some embodiments, the second comment may be different than the first comment.

Embodiments of the invention also include a computer program product comprising a non-transitory computer-readable medium embodying code executable by a computing system. The code may include receiving a first message from a first Internet service 110, storing the first comment in conjunction with the first content item in a database at a federated commenting server; determining that the first content item has been presented on a second Internet service 111; sending the first comment to the second Internet service 111; receiving a second message from the second Internet service 111; storing the second comment in conjunction with the first content item; and sending the second content item to the first Internet service 110. In some embodiments, the first message may indicate a first content item presented by the first Internet service 110 and/or may include a first comment received from a user in conjunction with the first content item. In some embodiments, the second message may indicate the first content item and/or may include a second comment received from a user in conjunction with the second content item.

In some embodiments, presenting the second comment with the first content item may include presenting a name associated with the second Internet service 111 or an identifier associated with the second Internet service 111. In some embodiments, presenting the second comment with the first content item may include presenting a name associated with the third Internet service.

In some embodiments, the first comment and the second comment are presented to users via the Internet. In some embodiments, the first content item, the first comment and the second comment are published via a webpage. In some embodiments, the first content item and the first comment are presented to users via a webpage and the second comment is presented to users via a mobile application. In some embodiments, the first content item and the first comment are presented to users via a mobile application and the second comment is presented to users via a webpage. In some embodiments, the first comment and the second comment may include text. In some embodiments, the second Internet service 111 and the third Internet service may include the same Internet service. In some embodiments, the first Internet service 110 may include one or more of a social network, a webpage, a web application, a network-based application, a website, a content network, a blog, a news webpage, a content sharing network, and/or a network-based app. In some embodiments, the first content item may include a video, a photo, an image, text, an article, a blog, streaming audio, an audio file, a slide show, a description of a product, or a streaming video.

Embodiments of the invention also include a federated commenting server comprising a network interface, a database; and a processor coupled with the network interface and the database. The processor may be configured to receive a first message from a first Internet service 110 through the network interface; store the first comment in conjunction with the first content item in the database; determine that the first content item has been presented on a second Internet service 111; send the first comment to the second Internet service 111 through the network interface; receive a second message from the second Internet service 111 through the network interface; storing the second comment in conjunction with the first content item in the database; and sending the second content item to the first Internet service 110 through the network interface. In some embodiments, the first message may indicate a first content item presented by the first Internet service 110 and/or may include a first comment received from a user in conjunction with the first content item. In some embodiments, the second message may indicate the first content item and/or may include a second comment received from a user in conjunction with the second content item.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

FIGS. 3A-7B illustrate a graphical example of processes for sharing comments among content according to some embodiments described herein.

DETAILED DESCRIPTION

Figure 1:
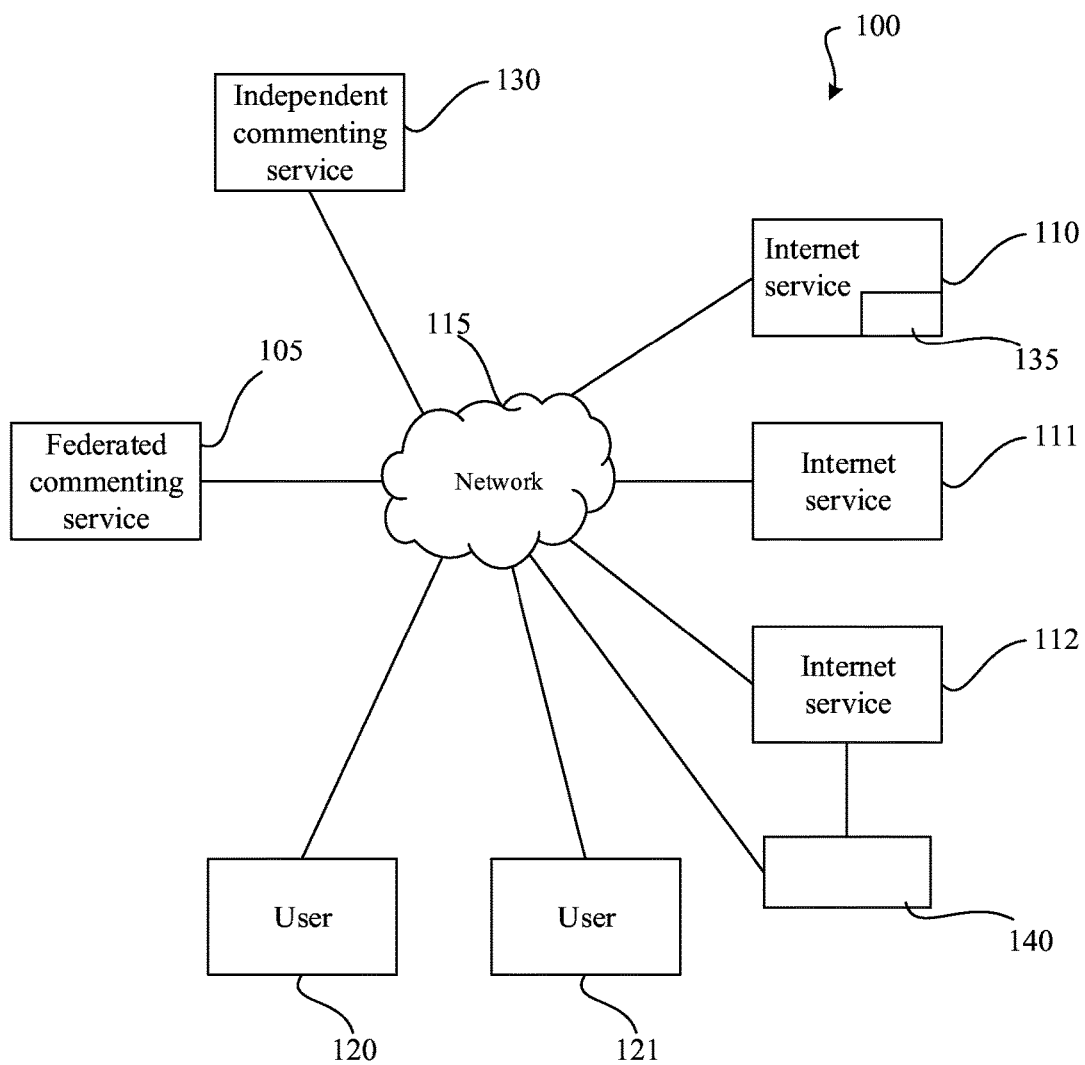
FIG. 1 illustrates a block diagram of a system for federated commenting for digital content according to some embodiments described herein.

Systems and methods are disclosed to share comments (and/or other attributes of the comment) of a content item (or similar or related content items) among different Internet services. A content item (e.g., an article or a video) presented on by an Internet service (e.g., a website, or in an app) may provide a commenting capability for users to comment on, or provide a comment related to or in association with, the subject matter of the content item. Once received by the Internet service, these comments may be presented with content item. The comments may be hosted by the Internet service that presents the content item or a comment management service. Similarly, a social network may allow users to post content item (or a link to the content item) on a user's wall, page or profile, or otherwise share or share a reference to the content item, and allow friends to comment on, or comment related to or in association with, the content item. These comments may be hosted by the social network (or elsewhere). The comments on the social network, the Internet service or the comment management service may not be integrated and remain separate. Thus, two or more separate sets of comments (and/or attributes) about the same or related content items may exist and may be presented to users in different ways or services. Embodiments described herein provide for sharing and/or other means of integration of comments between Internet services and/or services.

In some embodiments of the invention a content item may maintain information about the location of comments associated with the content item. For instance, the content item may include information pointing to a server or storage location that includes the comments associated with the content item. Another service, for example, may request retrieval of the comments and/or send additional comments to be stored in association with the content item.

A content item may include all or part of a video file, a video stream, a picture, an audio file, an audio stream, a link, a document, a quiz, a survey, a game, a product, an artist, an event, a place, text, a representation, a reference, an app, an application, a profile of an app or application or something else, a user, a profile, a service, a company, a description, metrics, a webpage, an article, a blog, one or more items that can be referenced by a link or other association, a comment, or any other digital data or item. A content item may include a collection of content items.

A content item may be hosted (or published, shared, provided, distributed, maintained, represented, referenced by, or otherwise made partially or wholly available) by a hosting service. While the content item may be hosted with a hosting service, it may be presented via a presenting service such as, for example, a webpage, in an application, in an app, etc. The presenting service may provide access to the content item, market the content item, provide a webpage, push the content item to apps or applications, push the content item to blogs, etc. The hosting service and/or the presenting service may include a web site, web page, web server, Internet service, host, app, Internet service, hardware, TV console, set-top box, digital media receiver, smartphone, handheld device, software, social network, news or entertainment service, etc. The hosting service and the presenting service may be the same service or may be different services.

FIG. 1 illustrates a block diagram of a system 100 for federated commenting for digital content according to some embodiments described herein. The system 100 includes a federated commenting service 105 coupled with a first Internet service 110, a second Internet service 111, and/or a third Internet service 112 through a network 115. The network 115 may be the Internet, a local network, a wide area network, a mobile network, and/or a wireless network or a combination of any or all of the above. In some embodiments, one or more of the first Internet service 110, the second Internet service 111, and/or the third Internet service 112 may be coupled directly or more directly with the federated commenting service 105. A first user computer 120 and/or a second user computer 121 may access content hosted by and/or presented by the federated commenting service 105, the first Internet service 110, the second Internet service 111, and/or the third Internet service 112 via the network 115. In some embodiments, more than one federated commenting service 105 may be used.

The first Internet service 110, the second Internet service 111, and/or the third Internet service 112 ("the Internet services") may, for example, host content and/or present content to users. The Internet services may present content to users through a webpage, an app executing on the user's smartphone or tablet, or an application running on a user's computing device. The content may be presented, for example, through Facebook, Twitter, YouTube, Instagram, Vimeo, Google+, SoundCloud, CNN, NYTimes, blogger, etc.

Each of the Internet services may execute on one or more servers that may, for example, be distributed across a network or the Internet. Similarly, the federated commenting service 105 may be executed by one or more servers or distributed servers.

Furthermore, in some embodiments, the Internet services may include Internet services or web-based programs. For example, the first Internet service 110 may be a first Internet service 110, the second Internet service 111 may be a second Internet service 111, and/or the third Internet service 112 may be a third Internet service.

In some embodiments, the federated commenting service 105 may be part of any of the first Internet service 110, the second Internet service 111 and/or the third Internet service. In other embodiments, each of the first Internet service 110, the second Internet service 111 and/or the third Internet service 112 may provide a federated commenting service 105. For example, the first Internet service 110, the second Internet service 111, and/or the third Internet service 112 may perform any or all of the functions described herein with regard to the federated commenting service 105.

In some embodiments, the first Internet service 110 may present content such as the first content item to users through a webpage that includes content hosted on the second Internet service 111. For example, the first Internet service 110 may host a webpage that includes a link to an image hosted at the second Internet service 111. From the user's perspective, when the user views the webpage, the content item is presented along with the rest of the webpage from the first Internet service 110.

In some embodiments, the first Internet service 110, the second Internet service 111, and/or the third Internet service 112 may use an independent commenting service 135 to manage and/or maintain comments for content presented on the Internet services. For example, a comment entered on content presented by the first Internet service 110 may be sent to independent commenting service 135 and the comments presented through the first Internet service 110 may be presented by via a link or any other method by the independent commenting service 135. In the various embodiments described herein, commenting may or may not be manage by an independent commenting service 135.

In some embodiments, the first Internet service 110 (or any other Internet service) may include an internal federated commenting service 135. In this way, internal federated commenting service 135 may perform any function or process described herein in regard to federated commenting service 105. Because the internal federated commenting service 135 is provided by the first Internet service 110, communication between the first Internet service 110 and the internal federated commenting service 135 may not occur through the internet.

In some embodiments, the third Internet service 112 (or any other Internet service) may include a federated commenting service 105. In this way, federated commenting service 105 may perform any function or process described herein in regard to federated commenting service 105. Because the federated commenting service 105 is coupled with the third Internet service 112, communication between the third Internet service 112 and the federated commenting service 105 may or may not occur through the internet.

Figure 15:
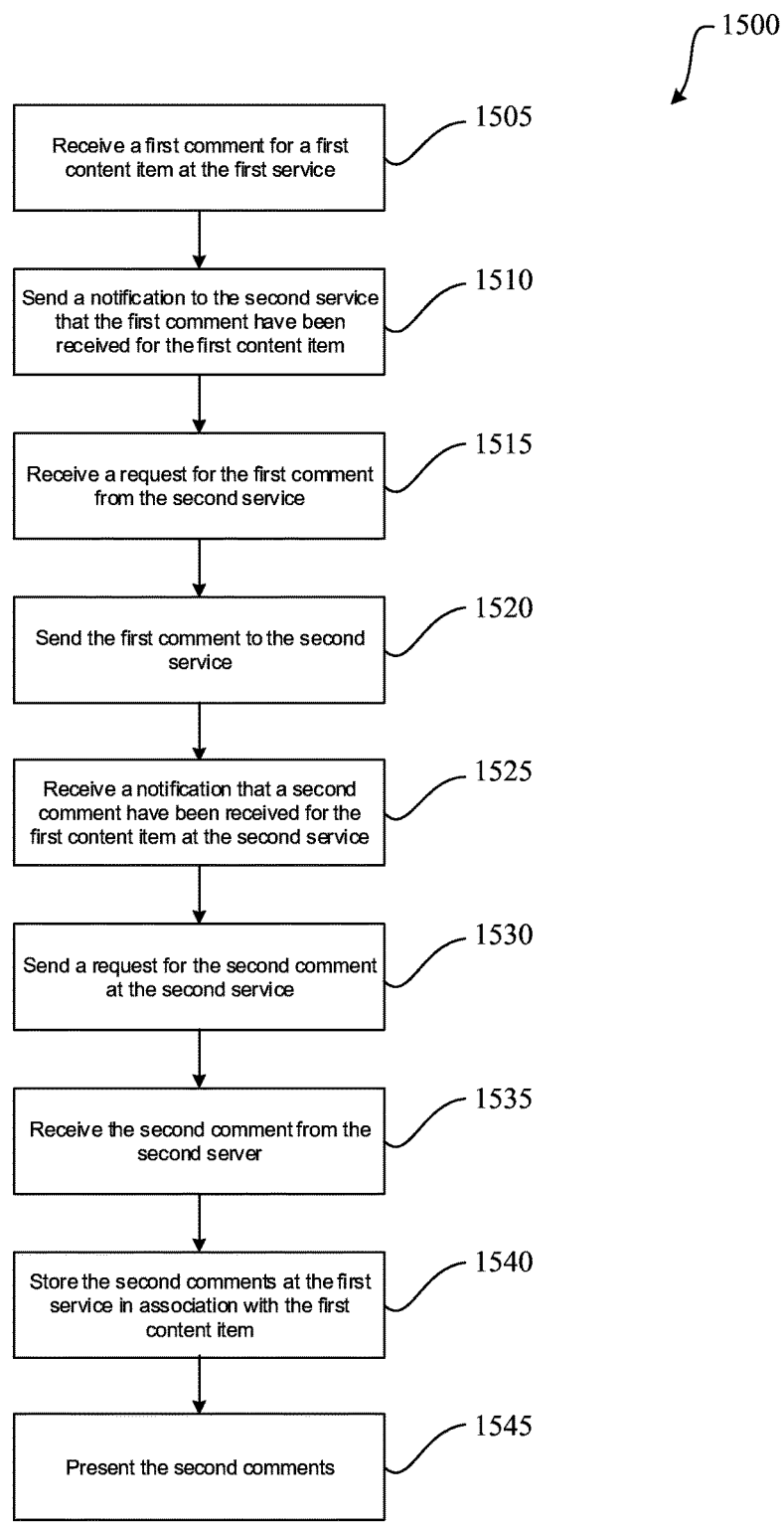
FIG. 15 is an example flowchart of a process for sharing comments between Internet services that present the same content item according to some embodiments described herein.

In some embodiments, the first Internet service 110, the second Internet service 111, the third Internet service 112, the first user computer 120, the second user computer 121, the federated commenting service 105, the independent commenting service 135, and/or the internal federated commenting service 135 may include all or any components of computational system 1500 shown in FIG. 15. Moreover, in some embodiments, the block diagram illustrated as system 100 may include any number of additional blocks and/or components, and/or any of the components shown in system 100 may or may not be included.

Figure 2:
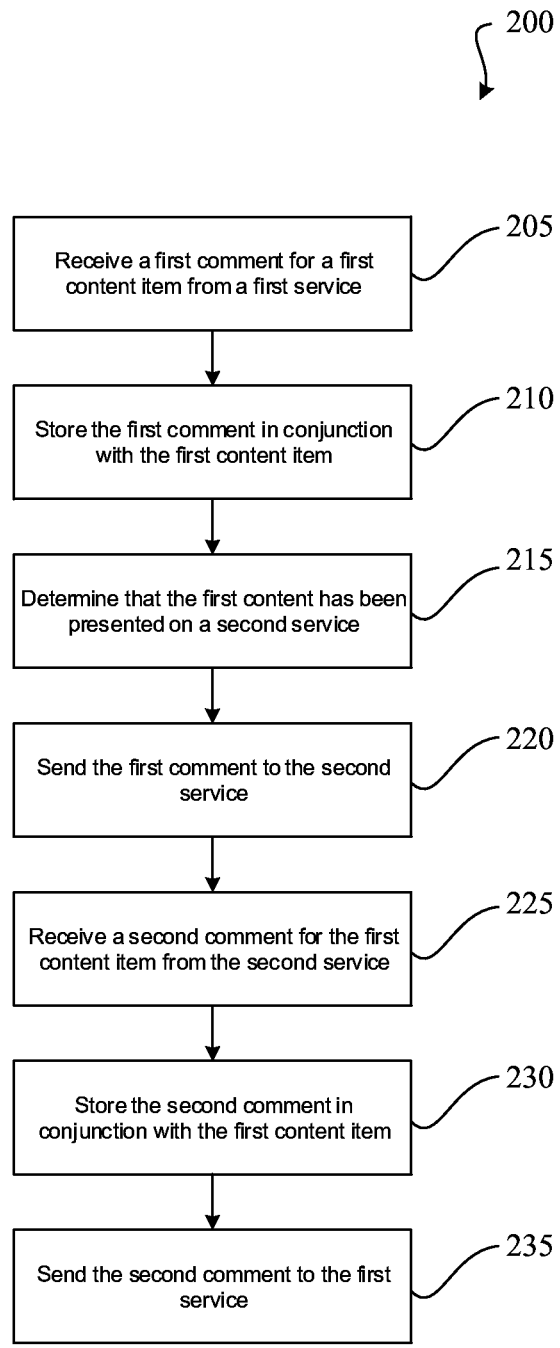
FIG. 2 is an example flowchart of a process for sharing comments between Internet services that present the same content item according to some embodiments described herein.

FIG. 2 is an example flowchart of a process 200 for sharing comments between Internet services that present the same content item according to some embodiments described herein. The process 200, for example, may be executed by the federated commenting service 105, internal federated commenting service 135, and/or federated commenting service 105. In some embodiments, a user viewing a first content item on a webpage presented by the first Internet service 110 may choose to comment on the first content item. The user may enter a first comment as text (or other content) through the user's user interface. The first comment may include one or more comments received from any number of users. The first content item may be presented by the first Internet service 110, but may be hosted by another Internet service. The first comment may be received at by the first Internet service 110 and presented with the first content.

Moreover, in some embodiments, the first comment may be made associated with the first content item along with one or more other content items. For example, the first content item may be a picture that is part of a blog entry. The first comment, therefore, may be associated with both the picture and/or the blog entry.

The process 200 starts at block 205, where the first comment for the first content item is received at the federated commenting service 105 from the first Internet service 110. The first comment may be sent, for example, from the first Internet service 110 to the federated commenting service 105 through the network 115. The first comment, for example, may be sent in a message and may include, for example, a link to the first comment, the name of the first Internet service 110, the user name of the user making the comment, the text of the comment, the date and/or time the comment was received at the Internet service; the comment number at the Internet service, a comment identifier; a link to the content, etc. Various communication protocols and/or techniques may be used to communicate the first comment to the federated commenting service 105.

At block 210, the first comment may be stored in conjunction with the first content item at the federated commenting service 105. The federated commenting service 105 may host all the comments received for the first content item. For example, the federated commenting service 105 may include memory within which the first comment and/or the first content item stored. A database may be used that links the first content item with the first comment. The database may also include other comments that are linked with the first content item. The content item and/or the comments may be stored, for example, within a relational database. The database may link a plurality of comments and the Internet services where the comments were provided with a content item.

At block 215, process 200 may determine that the first content item has been presented on the second Internet service 111. This may occur, for example, by noting in the database at the federated commenting service 105 that the first content item is presented by the second Internet service 111. As another example, the second Internet service 111 may send a message to the federated commenting service 105 that it is hosting the first content item. As another example, the federated commenting service may search the network (e.g., using a crawler or the like) for the first content item.

The first content item presented by the first Internet service 110 and the first content item presented by the second Internet service 111 may represent the same content item, or portions of the same content item. The first Internet service 110 and/or the second Internet service 111 may present a link to the first content item hosted by another Internet service (e.g., the third Internet service 112) and/or host the first content item.

Moreover, the first content item presented by the first Internet service 110 and the second Internet service 111 may include other content items in conjunction with the first content item. Furthermore, the first content item may be downloaded by the first Internet service 110 and the second Internet service 111 from another Internet service (e.g., the third Internet service 112).

At block 220, the first comment may be sent to the second Internet service 111 to be presented with the first content item presented at the second Internet service 111. This can occur using any technique, for example, as noted above in conjunction with block 205.

At block 225, a second comment for the first content item can be received at the federated commenting service 105 from the second Internet service 111. For example, a user viewing a first content item on a webpage presented by the second Internet service 111 may choose to comment on the first content item. The user may enter a second comment as text (or other content) through the user's user interface. The first content item may be presented by the second Internet service 111, but may be hosted by another Internet service. The second comment may be received at the second Internet service 111 and presented with the first content.

For example, a user viewing the first content item on a webpage hosted at the second Internet service 111 may choose to comment on the first content item. The user may enter a second comment as text (or other content) through the user's user interface. The second comment may be presented with the first content.

At block 230, the second comment may be stored in conjunction with the first content item at the federated commenting service 105. This may occur, for example, as described above in conjunction with block 210.

At block 235 the second comment may be sent to the first Internet service 110, for example, to be presented with the first content item hosted at the first Internet service 110. This can occur, using any technique, for example, as noted above in conjunction with block 205.

Additionally or alternatively, at block 210 process 200 may determine that a number of comments were previously associated with the first content item and received from another Internet service (e.g., the third Internet service 112). These comments, for example, may be stored in the database at the federated commenting service 105 in association with the first content item. In response to receiving the first comment for the first content item, these previously received comments or a subset of the previously received comments may be sent to the first Internet service 110, for example, to be presented with the first content item hosted at the first Internet service 110. This can occur, using any technique, for example, as noted above in conjunction with block 205.

The process 200 may extend to any number of Internet services and/or any number of comments. For example, a third comment for the first content item can be received at the federated commenting service 105 from the third Internet service 112. For example, a user viewing the first content item on a webpage hosted at the third Internet service 112 may choose to comment on the first content item. The user may enter a third comment as text (or other content) through the user's user interface. The third comment may be presented with the first content. The third comment may be stored in conjunction with the first content item at the federated commenting service 105. This may occur, for example, as described above in conjunction with block 210. The third comment may be sent to the first Internet service 110 to be presented with the first content item presented by the first Internet service 110 and/or sent to the second Internet service 111 to be presented with the first content item presented by the second Internet service 111. The third comment may also be sent to the second Internet service 111 to be presented with the first content item hosted at the second Internet service 111.

FIGS. 3A-7B illustrate a graphical example of processes for sharing comments among content according to some embodiments described herein. FIG. 3A shows a first user interface 300 providing a first content item 305 to a first user via the first user computer 120. The first user interface 300 may provide content items, for example, to the first user that are downloaded or retrieved from the first Internet service 110. In this example, the first content item 305 is a photograph of a horse. Various other content items may be used.

FIG. 3B shows a second user interface 350 providing the first content item 305 to a second user via the second user computer 121. The first user interface 300 may provide content items, for example, to the second user that are downloaded or retrieved from the second Internet service 111 (or possibly the first Internet service 110). In this example, both the first user interface 300 and the second user interface 350 provide the first content item 305. The first content item 305 may be downloaded from the same Internet service, yet be presented differently to users. For example, the content item may be presented by the first Internet service 110 (and/or the second Internet service 111) through a webpage, app or application by providing a link to the location of the Internet service using a URL that points to the storage location at a different Internet service.

Figure 4A:
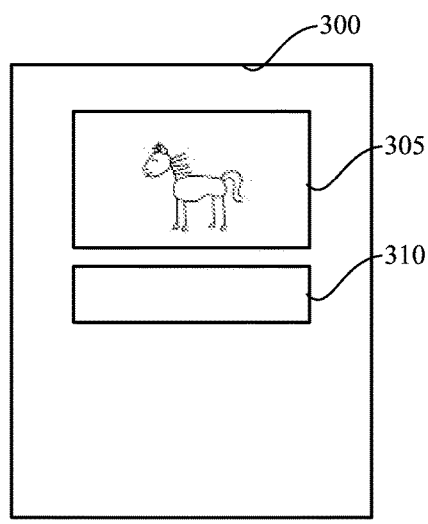
Figure 4B:
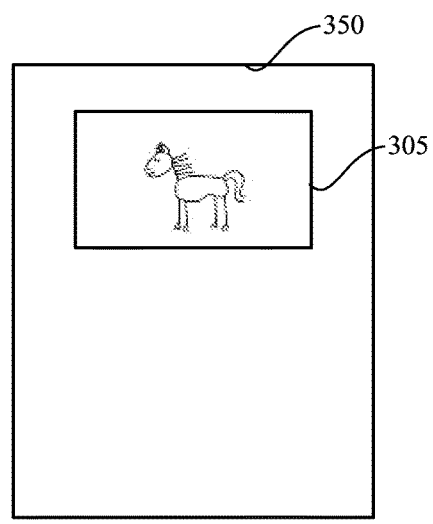

FIG. 4A shows the first content item 305 with a first comment 310. The first comment 310, for example, may be entered by the first user through a user interface of the first user computer 120. Once entered, the first comment 310 may be presented to users that view the first content 305 via the first Internet service 110, but the first comment 310 will not be provided to users that view the first content 305 via the second Internet service 111 as shown in FIG. 4B.

The first Internet service 110 may send the first comment to the federated commenting service 105 with an indication that it is associated with the first content item 305 and/or associated with one or more other content items. The federated commenting service 105 may link the first content item 305 provided by the first Internet service 110 and the first content item 305 provided by the second Internet service 111 and send the first comment 310 to the second Internet service 111. Then, as shown in FIG. 5B, the second user interface 350 may present the first comment 310.

As shown in FIG. 6B, a second comment 315 may be provided through the second user interface 350 for the first content item 305. The second comment 315 may be sent to the second Internet service 111 and provided to all users viewing the first content item 305 through the second Internet service 111. The second comment 315 may be sent to the federated commenting service 105 with an indication that it is associated with the first content item 305.

The federated commenting service 105 may link the first content item 305 provided by the first Internet service 110 and the first content item 305 provided by the second Internet service 111 and send the second comment 315 to the first Internet service 110. Then, as shown in FIG. 7A, the first user interface 300 may provide the second comment 315.

Thus, as shown, content items provided by unassociated Internet services may have linked comments by using the federated commenting service 105.

Figure 8:
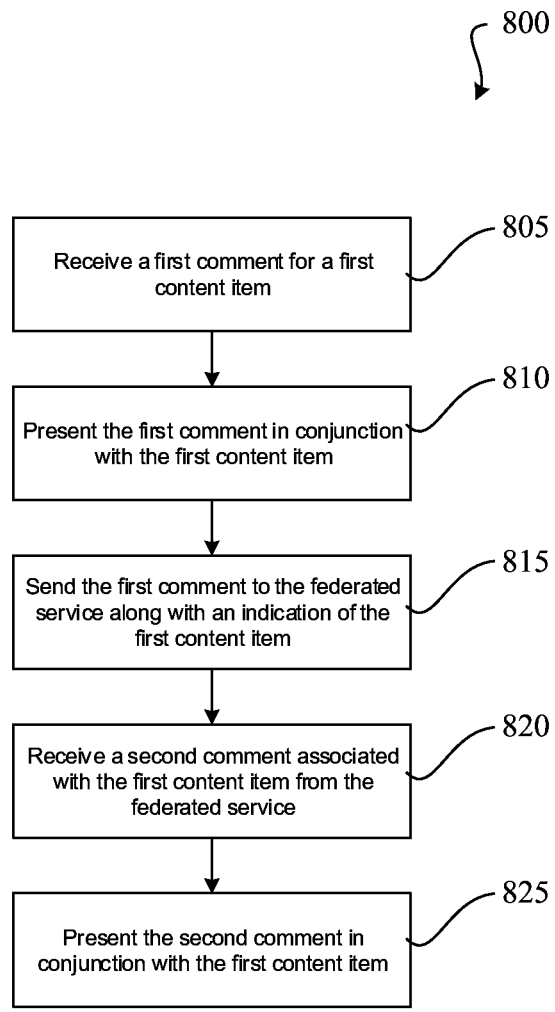
FIG. 8 is an example flowchart of a process for sharing comments between Internet services that present the same content item according to some embodiments described herein.

FIG. 8 is an example flowchart of a process 800 for sharing comments between Internet services that present the same content item according to some embodiments described herein. The process 800, for example, may be executed by any of the Internet services described herein or used elsewhere. The process 800 starts at block 805, where a first comment for a first content item is received at the first Internet service 110. The first comment may be received, for example, from the first user through the network 115 as the first user is viewing the first content. Indeed, the first user through the first user computer 120 may request the first content be sent to their computing device through the network 115. The first comment may then be presented with the first content item at block 810.

At block 815, the first comment may be sent to the federated commenting service 105. This may occur, for example, in a manner as described above in conjunction with block 205 of the process 200 in FIG. 2. The first comment may also be sent with an indication specifying the first content item. The indication may specify the content item using a unique identifier, a link, a title, a name, etc.

At block 820, the first Internet service 110 may receive a second comment from the federated commenting service 105. The second comment, for example, may have been received from a user at the second Internet service 111 and may be associated with and/or be related to the first content as presented on the second Internet service 111. The second comment may be received, for example, using any technique, for example, as noted above in conjunction with block 205. At block 825, the second comment may then be presented with the first content item.

The second comment received at block 820, may be a comment for the first content item presented by the second Internet service 111. The first content item presented by the first Internet service 110 and the first content item presented by the second Internet service 111 may be the same content item, or portions of the same content item. Moreover, the first content item presented by either Internet service may include other content items in conjunction with the first content item. Furthermore, the first content item may be downloaded by the first Internet service 110 and the second Internet service 111 from another Internet service (e.g., the third Internet service 112).

Alternatively or additionally, at block 820 the second comment may be received at the first Internet service 110 from the second Internet service 111 (or the first Internet service 110 and/or the third Internet service 112). In some embodiments, the federated commenting service 105 may notify the second Internet service 111 that the first content item is presented by the first Internet service 110. In response, the second Internet service 111 may send the first comment to the first Internet service 110.

Figure 9:
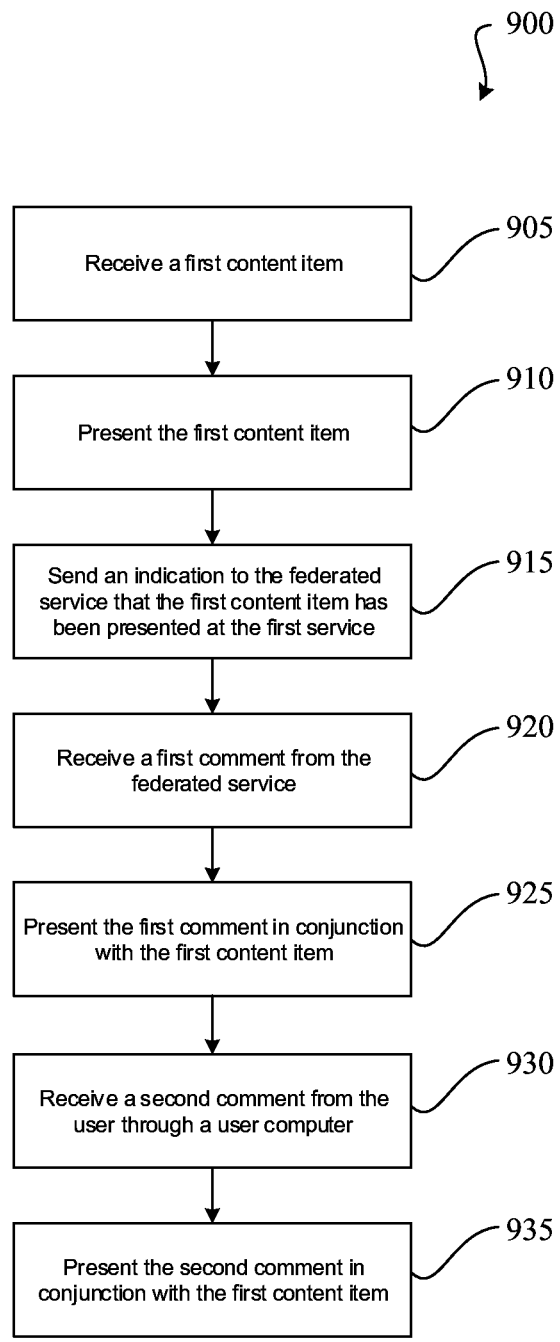
FIG. 9 is an example flowchart of a process for sharing comments between Internet services that present the same content item according to some embodiments described herein.

FIG. 9 is an example flowchart of a process 900 for sharing comments between Internet services that present the same content item according to some embodiments described herein. The process 900, for example, may be executed by any of the Internet services (e.g., the first Internet service 110). The process 900 starts at block 905, where a first content item may be received at the first Internet service 110. For example, the first Internet service 110 may host a social network and may receive the first content item from the user through the first user computer 120 for posting on the social network. At block 910, the first content item may be presented by the first Internet service 110.

At block 915, an indication of the first comment may be sent to the federated commenting service 105 along with an indication specifying the first comment's relationship with the first content. The first comment may be sent to the federated service using any technique, for example, as noted above in conjunction with block 205. The federated commenting service 105 may link the first content item hosted at the first Internet service 110 with the first content item being hosted on other Internet services.

At block 920, a first comment may be received at the first Internet service 110 from the federated commenting service 105. For example, the first comment may be received at the federated commenting service 105 from the second Internet service 111. At block 925, the first comment may be presented by the first Internet service 110 in conjunction with the first content item.

At block 920, in some embodiments, more than one comment may be sent from the first Internet service 110. These comments may have been stored in conjunction with the first content item at the federated commenting service and received from one or more other Internet services (e.g., the second Internet service 111 or the third Internet service 112). In such embodiments, the federated commenting service 105 may maintain a global comment database that is distributed to the Internet services presenting the content item associated with the comments.

At block 930, a second comment may be received from the user through the first user computer 120. The second comment may be sent to the first Internet service 110. At block 935, the first comment may be presented by the first Internet service 110 in conjunction with the first content item.

Alternatively or additionally, at block 920 the first comment may be received at the first Internet service 110 from the second Internet service 111. In some embodiments, the federated commenting service 105 may notify the second Internet service 111 that the first content item is presented by the first Internet service 110. In response, the second Internet service 111 may send the first comment to the first Internet service 110.

Figure 10:
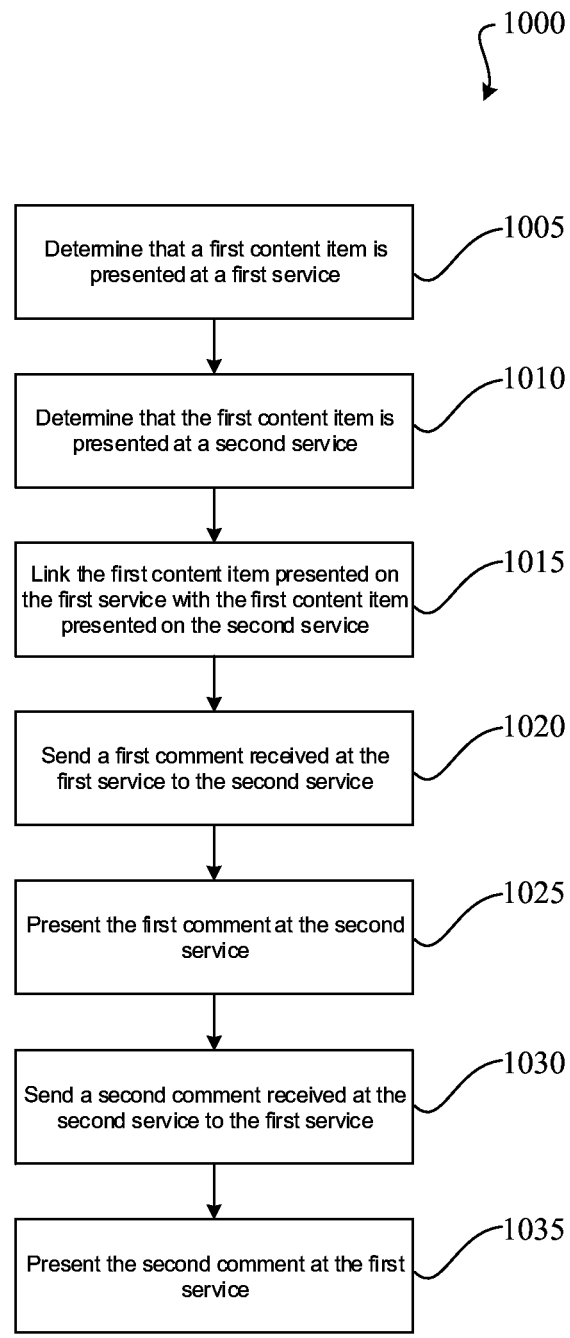
FIG. 10 is an example flowchart of a process for sharing comments between Internet services that present the same content item according to some embodiments described herein.

FIG. 10 is an example flowchart of a process 1000 for sharing comments between Internet services that present the same content item according to some embodiments described herein. The process 1000, for example, may be executed by the federated commenting service 105, internal federated commenting service 135, and/or federated commenting service 105. The process 1000 starts at block 1005, where it is determined that a first content item is presented by the first Internet service 110. For example, the federated commenting service 105 may monitor webpages that include content items to determine whether a comment was provided by a user associated with the content items. The federated commenting service may monitor websites, webpages, or content items that have been registered by a user. For instance, a user can specify that certain websites, webpages, or content items are tracked by the federated service. As another example, the federated commenting service may monitor specific websites such as file sharing sites, social networks, image sharing sites, blog services, newspapers, etc. for content items that permit commenting.

At block 1010 it may be determined that the first content item is presented by the second Internet service 111. This may occur in a similar or a different manner as block 1005.

The first content item presented by the first Internet service 110 and the first content item presented by the second Internet service 111 may be the same content item, or portions of the same content item. Moreover, the first content item presented by either Internet service may include other content items in conjunction with the first content item. Furthermore, the first content item may be downloaded by the first Internet service 110 and the second Internet service 111 from another Internet service (e.g., the third Internet service 112).

At block 1015, the first content item presented on the first Internet service 110 may be linked with the first content item presented on the second Internet service 111. This linking can be done, for example, using a database (e.g., a relational database). For example, the database can include an entry indicating a content item along with the services presenting the content item. In the process 1000, for example, the database can include an indication of the first content item with entries or links pointing to the first Internet service 110 and/or the second Internet service 111. The database may also indicate the specific location of the first content item presented by the first Internet service 110 and the second Internet service 111. The database may also include comments, links to the comments, or pointers to the comments received from the first Internet service 110 and the comments received from the second Internet service 111. The database may also include other data about the comments, the first content item, the first Internet service 110, and/or the second Internet service 111.

At block 1020, a first comment received at the first Internet service 110 can be sent to the second Internet service 111. The first comment, for example, can be sent to the second Internet service 111 through the federated commenting service 105. The first comment, for example, can be sent to the second Internet service 111 directly from the first Internet service 110. In doing so, the first Internet service 110 may have previously received an indication from the federated commenting service 105 to forward comments to the second Internet service 111.

At block 1025 the second Internet service 111 may present the first comment. The first comment may be presented, for example, with an indication specifying the user that provided the comment and/or an indication of the first Internet service 110. For example, if John Doe provides the first comment, the first Internet service 110 is YouTube, and the second Internet service 111 is Facebook, then Facebook may present the first comment noting that it was made by John Doe on YouTube. The second Internet service 111, for example, may also present a link to the comment on the first Internet service 110.

At block 1030, a second comment received at the second Internet service 111 can be sent to the first Internet service 110. The second comment, for example, can be sent to the first Internet service 110 through the federated commenting service 105. The second comment, for example, can be sent to the first Internet service 110 directly from the second Internet service 111. In doing so, the second Internet service 111 may have previously received an indication from the federated commenting service 105 to forward comments to the first Internet service 110.

At block 1035, the first Internet service 110 may present the second comment. The second comment may be presented, for example, with an indication specifying the user that provided the comment and/or an indication of the second Internet service 111. Keeping with the example provided in the previous paragraph and noting that the second comment was provided by Jane Doe, YouTube may present the second comment with an indication that it was provided by Jane Doe on Facebook.

Figure 11:
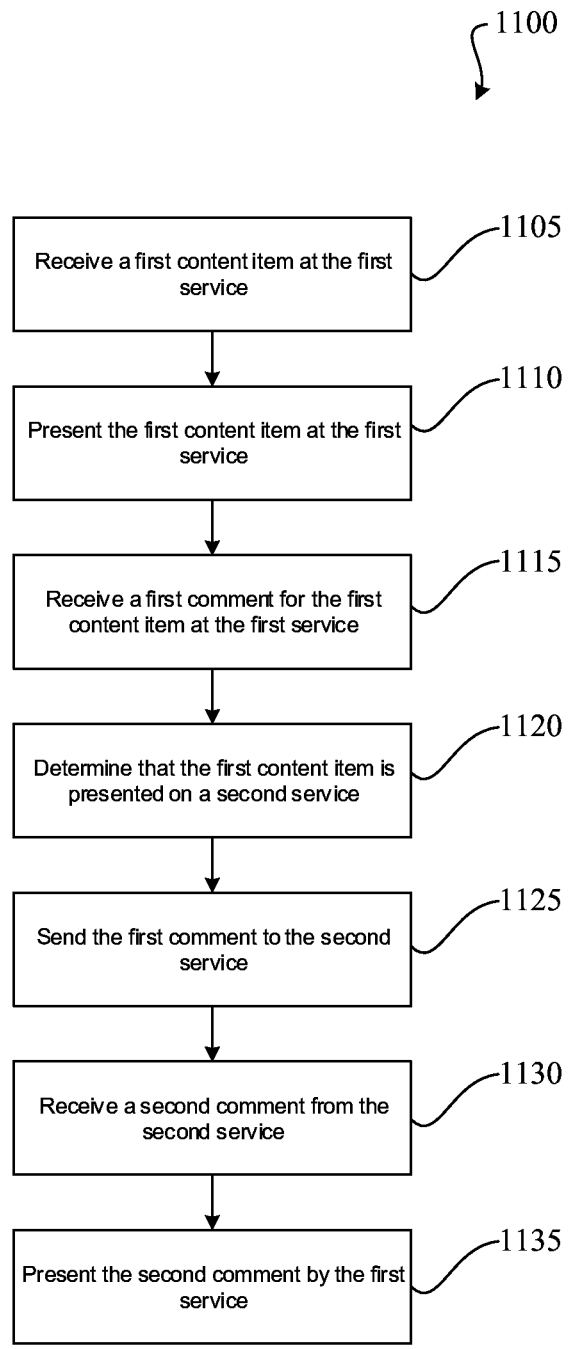
FIG. 11 is an example flowchart of a process for sharing comments between Internet services that present the same content item according to some embodiments described herein.

FIG. 11 is an example flowchart of a process 1100 for sharing comments between services that present the same content item according to some embodiments described herein. The process 1100, for example, may be executed by the first Internet service 110 (or any service). The process 1100 begins at block 1105, where a first content item is received at the first Internet service 110. The first content item may be received, for example, from a first user using the first user computer 120.

At block 1110, the first content item may be presented by the first Internet service 110. At block 1115 a first comment for the first content item may be received at the first Internet service 110. The first content item may be received through the Internet from a user through a user computer.

At block 1120, it can be determined whether the first content item is presented on another Internet service; for example, the second Internet service 111. This determination can be made in any number of ways. For example, the federated commenting service 105 may send an indication to the first Internet service 110 that the second Internet service 111 has presented the first content item. As another example, a web crawler or a web search may be used to determine whether the first content item has been presented by the second Internet service 111. As yet another example, the second Internet service 111 may present the content item using a link to the content item stored at the first Internet service 110, and the first Internet service 110 may determine that the first content item is presented by the second Internet service 111 when the first content item is fetched from the first Internet service 110.

The first content item presented by the first Internet service 110 and the first content item presented by the second Internet service 111 may be the same content item, or portions of the same content item. Moreover, the first content item presented by either Internet service may include other content items in conjunction with the first content item. Furthermore, the first content item may be downloaded by the first Internet service 110 and the second Internet service 111 from another Internet service (e.g., the third Internet service 112).

At block 1125, the first comment may be sent to the second Internet service 111 where the first comment may be presented. At block 1130, a second comment may be received from the second Internet service 111. For instance, the second comment may be received from a user at the second Internet service 111 and communicated to the first Internet service 110. At block 1135, the second comment may be presented by the first Internet service 110.

Figure 12:
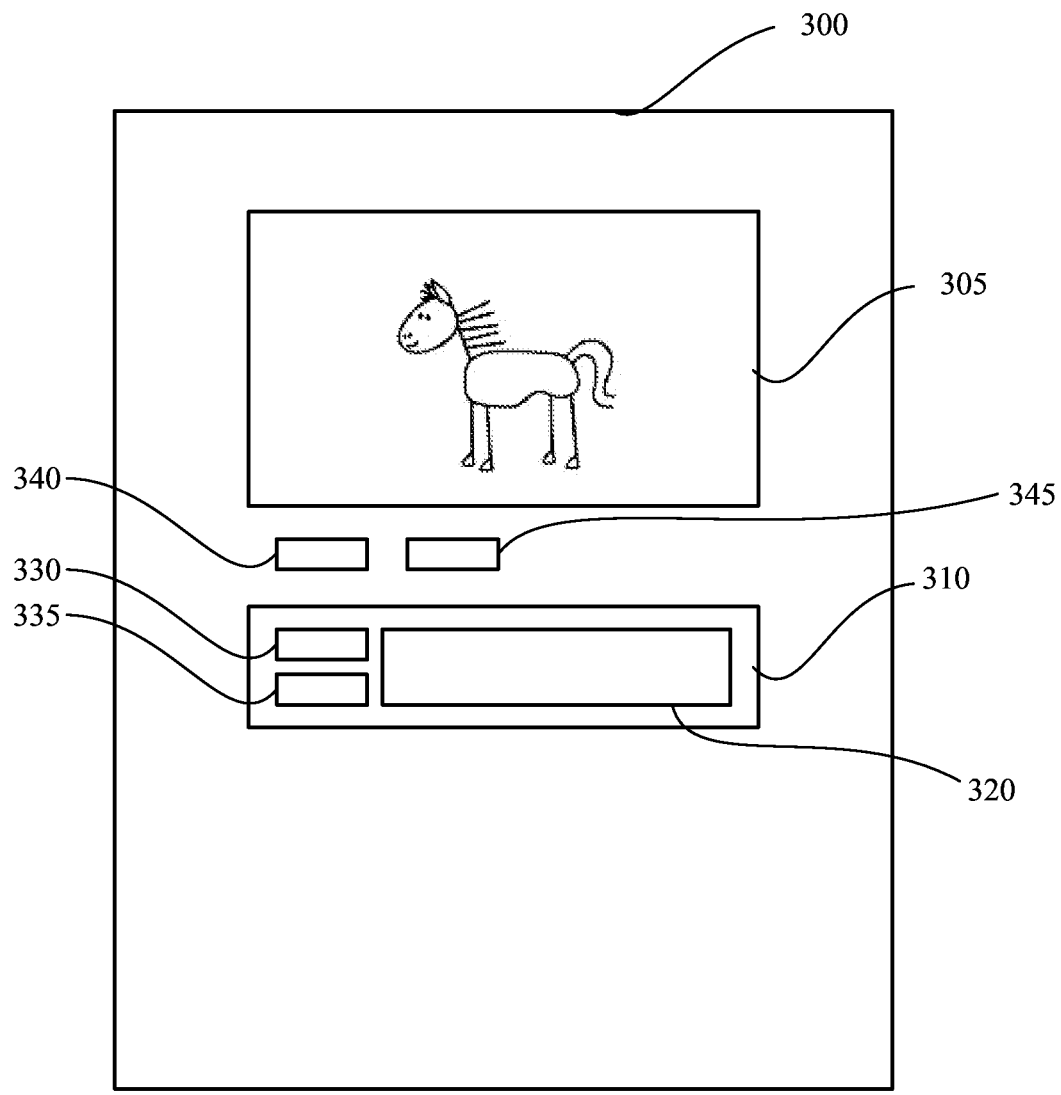
FIG. 12 illustrates a first user interface with a content item and comment according to some embodiments described herein.

FIG. 12 illustrates the first user interface 300 with the first content item 305 and the first comment 310 according to some embodiments described herein. The first content item may also include various attributes received from users associated with the first content item 305. First attribute 340 and second attribute 345 are shown. These attributes may include an aggregated score; an aggregated like count; an aggregated dislike count associated with the first comment 310; aggregated thumbs up count; aggregated thumbs down count; aggregated view count. These aggregated attributes may be summed from the attributes at two or more Internet services. For example, likes associated with the first content item 305 from a social network and thumbs up associated with the first content item 305 from a video sharing web site may be aggregated between the two services and presented to users as a single score. In embodiments described herein these attributes may be shared among Internet services in conjunction with or instead of comments.

The first comment 310 may include various attributes associated with the first comment 310 such as, for example, comment text 320; the name, alias, or username of a commenter 330; the name of the Internet services where the comment was posted 335; a date and/or time the first comment 310 was received at the service; an indication of the comment number at the service; an indication of the position of the comment relative to other comments, a comment identifier; a link to the content; an aggregated score associated with the first comment; an aggregated like count; an aggregated dislike count associated with the first comment 310; aggregated thumbs up count; aggregated thumbs down count; aggregated view count; and/or a name of the Internet service where comment was received. The name of the Internet service where comment was received may include the name of a webpage, an app, or an application. The name of the Internet service where comment was received may include, for example, Facebook, YouTube, Google Plus, Vimeo, Instagram, Twitter, etc. Various other components may be included with a comment.

In some embodiments, presenting or hosting a content item at an Internet service may include providing a link to a web browser, application, or app that points to the content item being hosted or stored at another network location. From the user's perspective, the link to the content item may be rendered by a web browser, app, or application such that the user is unaware of the storage location of the content item.

In some embodiments, presenting or hosting content items may include any technique that allows a user to access, view, interact with, and/or consume content through the Internet.

In some embodiments, a user may be provided with options to share a comment with only those viewing the comment on the Internet service presenting the comment. For example, a user may be viewing a content item presented by the first Internet service 110. The user may elect to have a comment only shared with other users viewing the content item through the first Internet service 110 or through the web page (or app or application) presenting the content item from the first Internet service 110. In some embodiments, a user may be provided with options to share a comment with users within a list such as a list of friends (e.g., Facebook friends), circles (e.g., from Google Prime), groups, etc. regardless of the Internet service through which the other users view the content.

In some embodiments, the first Internet service 110 may fetch or otherwise have access to the comments posted via the second Internet service 111 and/or the third Internet service 112. The first Internet service 110 may then display any set of the content on their Internet service or elsewhere with or without indications of the Internet service used to post each comment. The first Internet service 110, for example, may display up to the entire conversation (meaning the sum total of all comments posted about the content item on all services).

In some embodiments, comments may be stored at the first Internet service 110. The second Internet service 111 may then be provided a link to the comments hosted at the first Internet service 110 and display the comments within the link or display the link. In some embodiments, the second Internet service 111 may also store, send, retrieve, or otherwise utilize links to comments or other data in place of comments or other data. This may be similar to how a web page may include a mix of content that is hosted on multiple services, but it is all loaded on one page so as to appear as it's all coming from the same service.

Some embodiments described herein may make it easier for people to track the amount of dialog occurring for a content item. This may be valuable for the person posting the content and/or people or companies who otherwise have a relationship with the content or care about its usage and acceptance and other attributes. In some embodiments, metrics may be maintained that specify the number, quality, and category of comments received and/or shared with the various services. Also, some embodiments may allow users experiencing a content item to have a richer experience because they could more easily view more comments and/or a more cohesive conversation about the content item. People may even meet more Internet users because they can engage with a user that posted a comment on the same item but from an Internet service they weren't using.

In some embodiments, each of the first Internet service 110 and/or the second Internet service 111 and/or the third Internet service 112, many multiple services or services could contain the comments and/or links to comments. For example, the system could be distributed such that each of the services may also track and/or maintain up to the full set of comments related to at least a single content item. For example, the various services may exchange comments or links to comments with each other and/or through each other or by utilizing the federated commenting service 105. Up to the total conversation could thereby be hosted or otherwise contained or represented across one or more Internet services.

In some embodiments, each time a comment is posted on any of the Internet services, the comment, or the link to that comment, along with any relevant metadata, such as the indication from which Internet service the comment was posted and the identity of the person who posted it, could be distributed to each of the other participating Internet services.

In some embodiments, the first Internet service 110 may obtain only portions of the conversations at a time or the entire conversations at a time. The first Internet service 110 may also obtain up to the whole conversation over different points in time.

In some embodiments, the federated commenting service 105 may also access content from multiple Internet services and aggregate the conversations taking place for one or more pieces of content, even in the scenario where one or more of those Internet services do not explicitly participate in this activity. One of the Internet services may have comments, attributes or data available in such a way that they can be used by one of the other Internet services that may obtain them for purposes of including them in the tracking or aggregation of the conversation about one or more content items across a single or multiple Internet services.

In some embodiments, a comment may include other attributes such as, for example, a ranking, a vote, a descriptive ranking parameter, metrics, or other metadata. Embodiments of the invention described herein regarding the sharing of comments among Internet services may also share these other attributes. For example, a user may rate a content item using different Internet services and the ratings may be submitted to the federated commenting service 105 and shared with any of the other Internet services. In some embodiments, the federated commenting service 105 may compile the full set of ratings and/or statistics related to the ratings (or other metrics). The federated commenting service may display the ratings and/or statistics or share them with the other Internet services. Other Internet services or Internet services may obtain this compiled rating data and use or display it in any manner they choose to their users. Or this process could be distributed across Internet services and/or Internet services.

In some embodiments, comments related to a first content item may be stored within the federated commenting service 105 and distributed to various other Internet services (e.g., the first Internet service 110, the second Internet service 111, and/or the third Internet service 112) from the federated commenting service 105. For example, the federated commenting service 105 may send all the comments to another Internet service when requested, periodically, or when a new comment arrives. The federated comment service 105, for example, may also keep track of the comments sent to the various Internet services and only send the comments that a particular Internet service does not have to that Internet service. The federated commenting service 105, for example, may also send all the comments as a batch to each Internet service that is presenting a particular content item. The federated commenting service 105, for example, may also provide a link to the comments stored at the federated commenting service 105 and the other Internet services or a user's computer may pull these comments from the federated commenting service 105.

In some embodiments, comments may be stored at an Internet service other than the federated commenting service 105 (e.g., the first Internet service 110, the second Internet service 111, and/or the third Internet service 112) and communicated to any other Internet service without using the federated commenting service 105. For example, when the first Internet service 110 receives a first comment it may send the first comment to the second Internet service 111. Similarly, when the second Internet service 111 receives a first comment it may send the first comment to the first Internet service 110. In some embodiments, the first Internet service 110 may know that the second Internet service 111 is presenting a first content item when the second Internet service 111 provides a link to the first content item stored at the first Internet service 110. Similarly, the second Internet service 111 may request comments from the first Internet service 110 because the second Internet service 111 provides a link the first content item at the first Internet service 110. In this embodiment, both the first Internet service 110 and the second Internet service 111 may store all the comments received at both the first Internet service 110 and the second Internet service 111.

In some embodiments, the first Internet service 110 may send individual links (or a URL) to comments stored at the first Internet service 110 either to the federated commenting service 105 or the second Internet service 111. For example, a first link that points directly to a first comment, a second link that points directly to a second comment, etc. Similarly, the second Internet service 111 may send links to individual comments stored at the second Internet service 111. In this embodiment, comments may be stored at the Internet service that received the comment, yet the comments may be shared by providing links to the individual comments by other Internet services.

Figure 13:
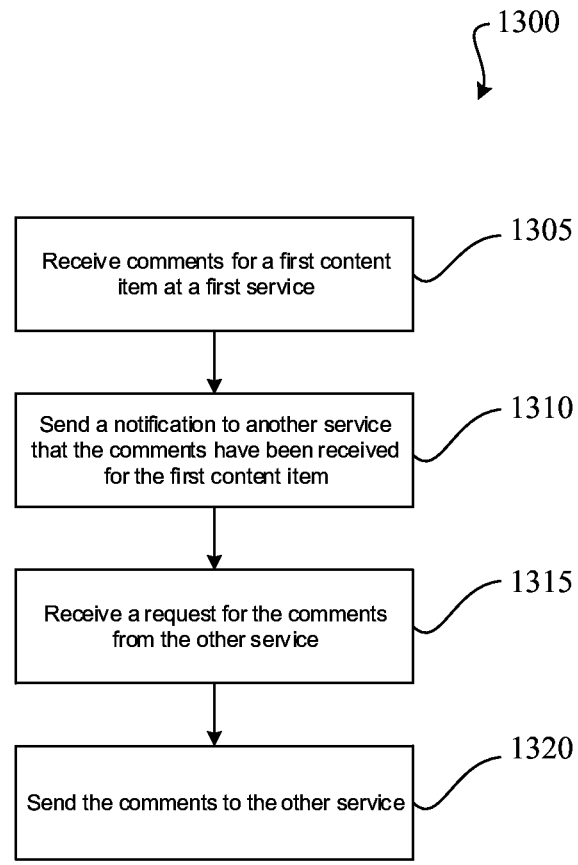
FIG. 13 is an example flowchart of a process for sending one or more comments related to a content item according to some embodiments described herein.

FIG. 13 is an example flowchart of a process 1300 for sending one or more comments related to a content item according to some embodiments described herein. The process 1300, for example, may be executed by the first Internet service 110 (or any other Internet service). The process 1300 begins at block 1305, where one or more comments related to a first content item may be received at the first Internet service 110. These comments, for example, may be received through network 115 from a plurality of different users through the user computer 120 and/or the user computer 121.

At block 1310 a notification may be sent to another Internet service indicating that the first Internet service 110 includes the comments. The other Internet service may include, for example, the second Internet service 111, the federated commenting service 105, the internal federated commenting service 135, and/or the federate commenting service 105. The notification may include any type of message that indicates that one or more comments have been received at the first Internet service 110, for example, an HTTP Post.

At block 1315, another Internet service other than the first Internet service 110 may send a request to the first Internet service 110 requesting the one or more comments. The request may be any type of request such as, for example, an HTTP Get request. In some embodiments, the service sending the request may be a different Internet service than the Internet service described in block 1310. For example, at block 1310 the notification may be sent to the federated commenting service 105 (or the internal federated commenting service 135 or the federated commenting service 105) and at block 1315 the second Internet service 111 (or the third Internet service 112) may send the request to the first Internet service 110.

At block 1320, the one or more comments may be sent to the other Internet service in response to receiving the request sent in block 1315. The other Internet service may store the one or more comments and/or present the one or more comments in conjunction with the first content item. In some embodiments, block 1305 and/or block 1310 may be omitted.

Figure 14:
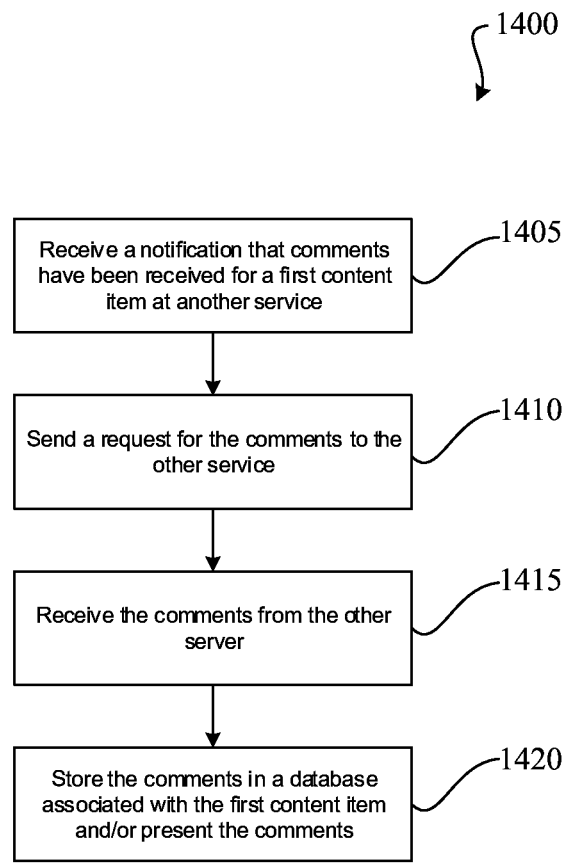
FIG. 14 is an example flowchart of a process for requesting one or more comments from an Internet service according to some embodiments described herein.

FIG. 14 is an example flowchart of a process 1400 for requesting one or more comments from an Internet service according to some embodiments described herein. The process 1400, for example, may be executed by the second Internet service 111 (or any other Internet service). The process 1400 begins at block 1405, where a notification is received from another Internet service (e.g., the first Internet service 110, or the federated commenting service 105, or the federated commenting service 105, or the internal federated commenting service 135) that comments related to a first content item have been received at the other Internet service.

At block 1410, a request for the comments may be sent to the first Internet service 110 (or the federated commenting service 105, or the federated commenting service 105, or the internal federated commenting service 135). At block 1415 the one or more comments may be received from the other Internet service.

At block 1420 the comments may be stored in a database and/or presented to users. If the Internet service is a federated commenting service (or the federated commenting service 105, or the federated commenting service 105, or the internal federated commenting service 135) the comments may be stored in a database until requested from another Internet service. If the Internet service is the second Internet service 111 (or third Internet service 112), then the comments may be stored in a database and/or presented to users through the Internet.

In some embodiments, block 1405 may be omitted. In such embodiments, process 1400 may repeat periodically or in response to receiving comments from users or in response to a page reload or a page request.

In some embodiments, a plurality of comments may be received at the third Internet service 112 from the first Internet service 110 and the second Internet service 111. The comments may be presented by the third Internet service 112 in any order. For example, the comments may be presented by the third Internet service 112 in the order they were received by the first Internet service 110 and/or the second Internet service 111 based on a time stamp associated with each of the comments. As another example, the comments may be ordered by the federated commenting service 105 based on the order the comments were received at the federated commenting service 105 and the sent to the third Internet service 112. As another example, the comments may be ordered based on an order number provided by the first Internet service 110 and/or the second Internet service 111. In some embodiments, the comments may be ordered by the federated commenting service 105 or the third Internet service 112. Various other techniques may be used to order the comments.

Process 1300 and process 1400 may be executed by the same service in conjunction with a single content item being presented by the Internet service. An example of this is shown in FIG. 15, which shows a flowchart of a process 1500 for sharing comments between Internet services that present the same content item according to some embodiments described herein. The process 1500 may be executed by the first process 110. The process 1500 begins at block 1505, where first comments, which may include one or more comments, related to a first content item may be received at the first Internet service 110. These comments, for example, may be received through network 115 from a plurality of different users through the user computer 120 and/or the user computer 121.

At block 1510 a notification may be sent to the second Internet service 111 indicating that the first Internet service 110 includes the first comments. The notification may include any type of message that indicates that the first comments have been received at the first Internet service 110, for example, the message may include an HTTP Post.

At block 1515, the first Internet service 110 may receive a request from the second Internet service 111 requesting the first comments. The request may be any type of request such as, for example, an HTTP Get request. The request, for example, may be sent through the federated commenting service 105 (or the internal federated commenting service 135 or the federated commenting service 105) or directly to the first Internet service 110 through the network 115.

At block 1520, the first comments may be sent to the second Internet service 111 in response to receiving the request sent in block 1515. The first comments may be sent to the second Internet service 111 through the federated commenting service 105 (or the internal federated commenting service 135 or the federated commenting service 105) or directly to the second Internet service 111 through the network 115. The second Internet service 111 may store the first comments and/or present the first comments in conjunction with the first content item. In some embodiments, block 1505 and/or block 1510 may be omitted.

At block 1525 a notification may be received at the first Internet service 110 from the second Internet service 111 that second comments, which may include one or more comments, related to the first content item have been received at the second Internet service 111.

At block 1530, the first Internet service 110 may send a request for the second comments to the second Internet service 111. The request may be any type of request such as, for example, an HTTP Get request. The request, for example, may be sent through the federated commenting service 105 (or the internal federated commenting service 135 or the federated commenting service 105) or directly to the first Internet service 110 through the network 115.

At block 1535 the second comments may be received at the first Internet service 110 from the second Internet service 111. At block 1540 the second comments may be stored in a database at the first Internet service 110. At block 1545, the second comments may be presented to users through the network 115.

In some embodiments, a plurality of comments may be received at the third Internet service 112 from the first Internet service 110 and the second Internet service 111. The comments may be presented by the third Internet service 112 in any order. For example, the comments may be presented by the third Internet service 112 in the order they were received by the first Internet service 110 and/or the second Internet service 111 based on a time stamp associated with each of the comments. As another example, the comments may be ordered by the federated commenting service 105 based on the order the comments were received at the federated commenting service 105 and the sent to the third Internet service 112. As another example, the comments may be ordered based on an order number provided by the first Internet service 110 and/or the second Internet service 111. In some embodiments, the comments may be ordered by the federated commenting service 105 or the third Internet service 112. Various other techniques may be used to order the comments.

In any of the processes described herein, comments may be received at an Internet service from one or more other Internet services in any order. In some embodiments, these comments may be received at the Internet service in the order received at other Internet services. In some embodiments, comments may or may not be received at the Internet service in any particular order.

In some embodiments, an Internet service (e.g., the first Internet service 110) may present comments received from another Internet service (e.g., the second Internet service 111), but may not share comments received at the Internet service. Alternatively, in some embodiments, an Internet service (e.g., the first Internet service 110) may not present comments received from another Internet service (e.g., the second Internet service 111), but may not share comments received at the Internet service.

Figure 16:
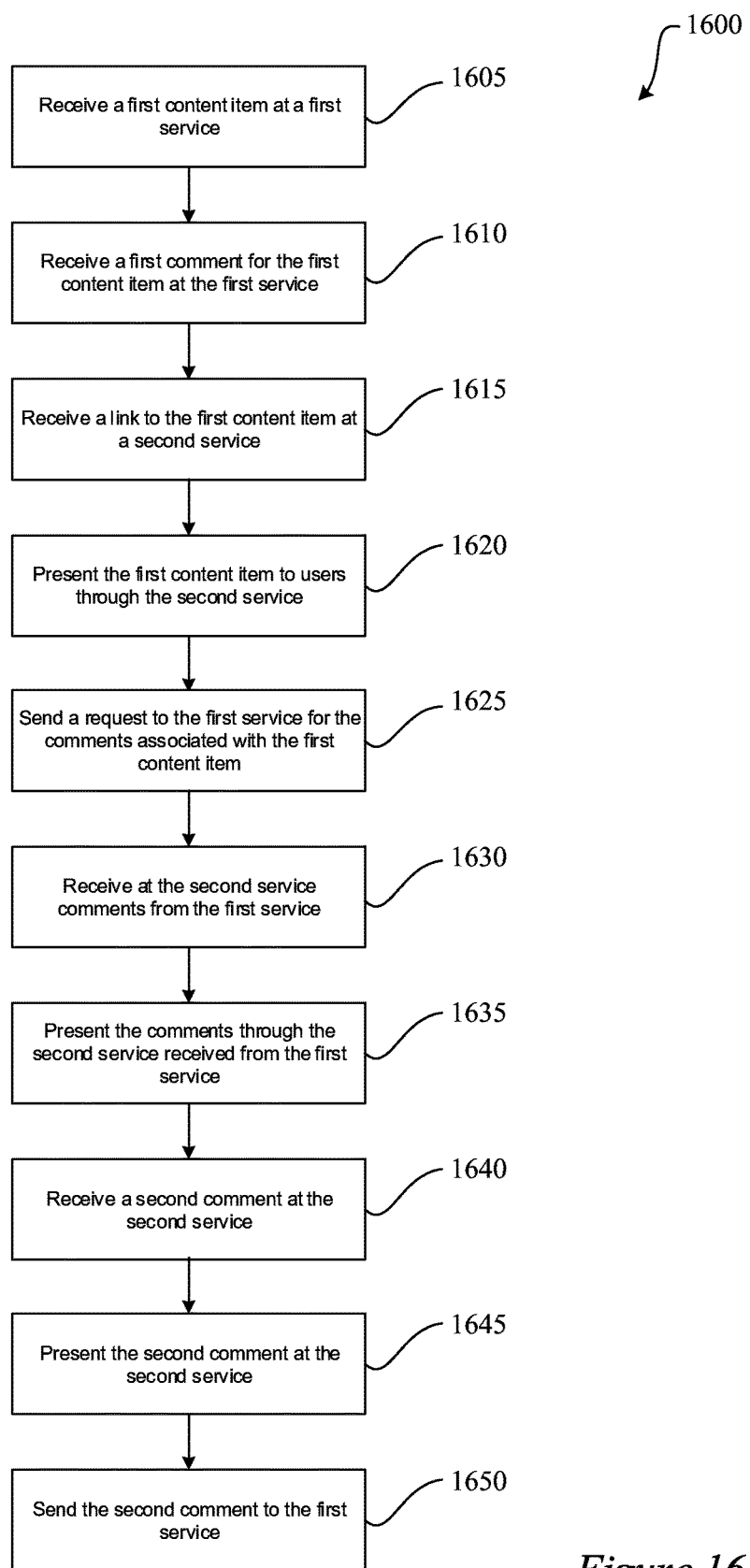
FIG. 16 is an example flowchart of a process for sharing comments between Internet services that present the same content item according to some embodiments described herein.

FIG. 16 is an example flowchart of a process 1600 for sharing comments between Internet services that present the same content item according to some embodiments described herein. Process 1600 begins at block 1605 where a first content item is received at the first Internet service 110 through the network 115. The first content item may also be stored at the first Internet service 110 and/or presented to users at the first Internet service 110. At block 1610 a first comment for the first content item may be received at the first Internet service 110 through the network 115. The first comment, for example, may be received from a user through the Internet.

At block 1615 the second Internet service 111 may receive a link to the first content item through the network 115, and, at block 1620, the second Internet service 111 may present the first content item to users through the second Internet service 111. At block 1625 the second Internet service 111 may send a request to the first Internet service 110 for the comments received at the first Internet service 110 through the network 115. The request may be any type of request such as, for example, an HTTP Get request. At block 1630 the second Internet service 111 may receive the comments from the first Internet service 110, which may include the first comments. Block 1620, 1625 and/or 1630 may occur in any order.

At block 1635 the comments received at the first Internet service 110 may be presented through the second Internet service 111. At block 1640, the second Internet service 111 may receive a second comment for the first content item through the network 115. At block 1645 the second comment may be presented to users through the second Internet service 111. At block 1650 the second comment may be sent to the first Internet service 110 through the network 115. Blocks 1645 and 1650 may occur in any order. In some embodiments, either block 1645 and/or block 1645 may be omitted.

In some embodiments, the first and/or second comment may be saved a centralized commenting service (e.g., federated commenting service 105, internal federated commenting service 135, and/or independent commenting service 135). Both the first Internet service 110 and/or the second Internet service 111 may send and/or receive comments to and/or from the centralized commenting service.

Process 1600 may be illustrated by the following example. A video may be posted by a first user to a video sharing web site at block 1605. At block 1610 a user may enter a comment on the video through a comment entry box. This comment may be presented to users at the video sharing web site. At block 1615 a second user may share a link to the video through a social network. The link may point to the video hosted at the video sharing web site and/or may be presented through the social network at block 1620. At block 1625, the social network may send a request to the video sharing web site for the first comment (and/or any other comments) presented at the video sharing web site. At block 1635, the first comment may be received The social network may also receive comments related to the video at block 1640. These comments may be presented to user through the social network 1645. The comments may also be sent to the video sharing web site at block 1650 where the comments may be stored in conjunction with the first content item and/or presented to users through the video sharing web site.

Figure 17:
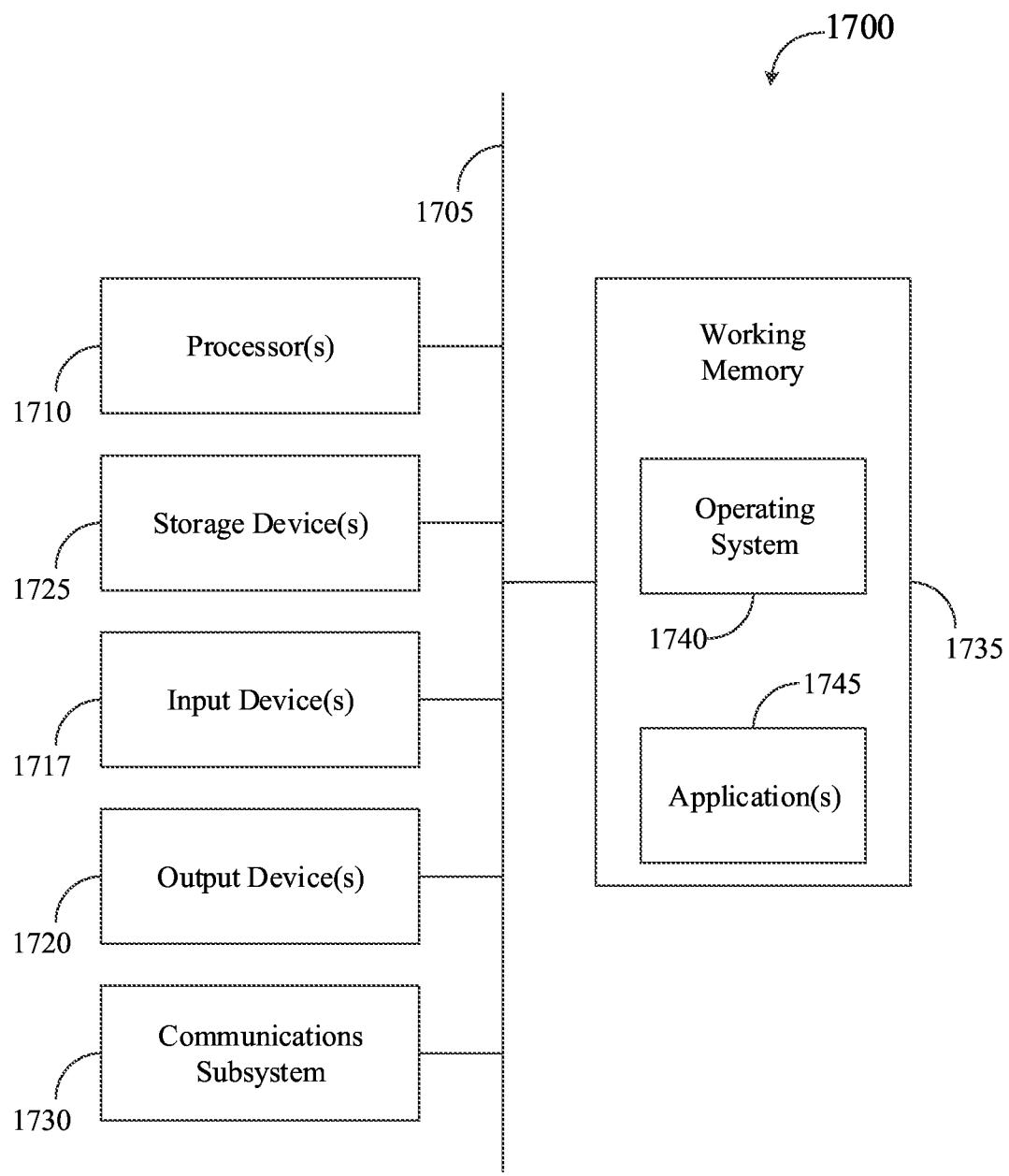
FIG. 17 shows an illustrative computational system for performing functionality to facilitate implementation of embodiments described herein.

A computational system 1700 (or processing unit) illustrated in FIG. 17 can be used to perform any of the embodiments of the invention. For example, the computational system 1700 can be used alone or in conjunction with other components to execute all or parts of the processes 200, 800, 900, 1000, 1100, 1300, 1400, 1500, and/or 1600. As another example, the computational system 1700 can be used to perform any calculation, solve any equation, perform any identification, and/or make any determination described here. Any of the Internet services described herein may include all or portions of the computation system 1700. The computational system 1700 includes hardware elements that can be electrically coupled via a bus 1705 (or may otherwise be in communication, as appropriate). The hardware elements can include one or more processors 1710, including, without limitation, one or more general purpose processors and/or one or more special purpose processors (such as digital signal processing chips, graphics acceleration chips, and/or the like); one or more input devices 1715, which can include, without limitation, a mouse, a keyboard, and/or the like; and one or more output devices 1720, which can include, without limitation, a display device, a printer, and/or the like.

The computational system 1700 may further include (and/or be in communication with) one or more storage devices 1725, which can include, without limitation, local and/or network-accessible storage and/or can include, without limitation, a disk drive, a drive array, an optical storage device, a solid-state storage device, such as random access memory ("RAM") and/or read-only memory ("ROM"), which can be programmable, flash-updateable, and/or the like. The computational system 1700 might also include a communications subsystem 1730, which can include, without limitation, a modem, a network card (wireless or wired), an infrared communication device, a wireless communication device, and/or chipset (such as a Bluetooth device, an 802.6 device, a Wi-Fi device, a WiMax device, cellular communication facilities, etc.), and/or the like. The communications subsystem 1730 may permit data to be exchanged with a network (such as the network described below, to name one example) and/or any other devices described herein. In many embodiments, the computational system 1700 will further include a working memory 1735, which can include a RAM or ROM device, as described above.

The computational system 1700 also can include software elements, shown as being currently located within the working memory 1735, including an operating system 1740 and/or other code, such as one or more application programs 1745, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 1725 described above.

In some cases, the storage medium might be incorporated within the computational system 1700 or in communication with the computational system 1700. In other embodiments, the storage medium might be separate from the computational system 1700 (e.g., a removable medium, such as a compact disc, etc.), and/or provided in an installation package, such that the storage medium can be used to program a general purpose computer with the instructions/code stored thereon. These instructions might take the form of executable code, which is executable by the computational system 1700 and/or might take the form of source and/or installable code, which, upon compilation and/or installation on the computational system 1700 (e.g., using any of a variety of generally available compilers, installation programs, compression/decompression utilities, etc.), then takes the form of executable code.

The various blocks shown in any of the processes or flowcharts shown in the figures may occur in any order unless otherwise noted. Moreover, various steps, blocks, processes, etc. may be inserted between blocks and/or any blocks may be removed from the processes.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

That which is claimed:

1. A method for sharing comments among Internet services, the method comprising:
   presenting a first content item to one or more users via the Internet via a first social network;
   receiving at the first social network a first comment that is related to the first content item, wherein the first comment is received from a user through the Internet;
   presenting the first comment in conjunction with the first content item via the first social network;
   sending the first comment from the first social network to a second social network;
   receiving at the first social network a second comment from the second social network, wherein the second social network presents the first content item to one or more users via the Internet, wherein the second comment was received at the second social network from a user through the Internet, and wherein the second comment is related to the first content item;
   presenting the second comment in conjunction with the first content item via the first social network, wherein presenting the second comment in conjunction with the first content item includes presenting a name of the second social network or an identifier of the second social network; and presenting an aggregate likes count associated with the second comment that includes a sum of likes associated with the second comment from the first social network and likes associated with the second comment from the second social network.

2. The method according to claim 1, wherein the second comment is different than the first comment.

3. The method according to claim 1, wherein the first content item, the first comment and the second comment are presented to users via the Internet.

4. The method according to claim 1, wherein the first content item, the first comment and the second comment are presented via a webpage.

5. The method according to claim 1, wherein the first content item, the first comment and the second comment are presented to users via a mobile application.

6. The method according to claim 1, wherein the first comment and the second comment comprise text.

7. The method according to claim 1, wherein either or both the first comment and the second comment include comment attributes selected from the group consisting of a username of a commenter, an alias of a commenting, a name of a commenter, a date and/or time the comment was received at the service, an indication of the comment number at the service, an indication of the position of the comment relative to other comments, a comment identifier, a link to the content; a score associated with the first comment, a like or dislike associated with the first comment, and a name of the social network where comment was received.

8. The method according to claim 1, further comprising:
receiving a third comment from a third social network, wherein the third comment is different than the first comment and the second comment; and
presenting the third comment with the first content item.

9. The method according to claim 1, wherein the first content item is selected from the group consisting of a video, a photo, an image, text, an article, a blog, streaming audio, an audio file, a slide show, a description of a product, and a streaming video.

10. The method according to claim 1, wherein either or both the first comment and the second comment include comment attributes selected from the group consisting of a username of a commenter, an alias of a commenting, a name of a commenter, a date and/or time the comment was received at the service, an indication of the comment number at the service, an indication of the position of the comment relative to other comments, a comment identifier, a link to the content; a score associated with the first comment, a like or dislike associated with the first comment, and a name of the social network where comment was received.

11. A method for sharing comments among social networks, the method comprising:
receiving, at a second social network, a link to a first content item hosted at a first social network, wherein the first social network presents the first content item to one or more users through the Internet;
presenting the first content item to one or more users via the second social network;
sending a request from the second social network to the first social network for comments received at the first social network that are associated with the first content item;
receiving at the second social network at least a first comment associated with the first content item from the first social network;
presenting at least the first comment in conjunction with the first content item via the second Internet service, wherein presenting the first comment with the first content item at the second Internet service includes presenting a name associated with the first Internet service or an identifier associated with the first Internet service;
receiving a second comment via the second social network through the Internet from a user; and
presenting the second comment in conjunction with the first content item via the second social network, wherein presenting the second comment in conjunction with the first content item includes presenting an aggregate likes count associated with the second comment that includes a sum of likes associated with second comment from the first social network and likes associated with the second comment from the second social.

12. The method according to claim 11, further comprising sending the second comment to the first social network.

13. The method according to claim 11, wherein either or both the first comment and the second comment include comment attributes selected from the group consisting of a username of a commenter, an alias of a commenting, a name of a commenter, a date and/or time the comment was received at the service, an indication of the comment number at the service, an indication of the position of the comment relative to other comments, a comment identifier, a link to the content; a score associated with the first comment, a like or dislike associated with the first comment, and a name of the social network where comment was received.

14. A method for sharing comments among social networks, the method comprising:
presenting a first content item to one or more users via the Internet via a first social network service;
receiving at the first social network service a first comment that is related to the first content item, wherein the first comment is received from a user through the Internet;
presenting the first comment in conjunction with the first content item via the first social network service;
sending the first comment from the first social network service to a second social network service, wherein the second social network service presents the first content item and the first comment to one or more users via the Internet;
receiving at the first social network service a second comment from the second social network service, wherein the second comment is different than the first comment, wherein the second comment was received at the second social network service from a user through the Internet, and wherein the second comment is related to the first content item; and
presenting the second comment in conjunction with the first content item via the first social network service, wherein presenting the second comment with the first content item at the first social network includes presenting a name associated with the second social network or an identifier associated with the second social network, wherein presenting the second comment in conjunction with the first content item includes presenting an aggregate likes count associated with the second comment that includes a sum of likes associated with second comment from the first social network and likes associated with the second comment from the second social network.

15. The method according to claim 14, wherein either or both the first comment and the second comment include comment attributes selected from the group consisting of a username of a commenter, an alias of a commenting, a name of a commenter, a date and/or time the comment was received at the service, an indication of the comment number at the service, an indication of the position of the comment relative to other comments, a comment identifier, a link to the content; a score associated with the first comment, a like or dislike associated with the first comment, and a name of the social network service where comment was received.

16. The method according to claim 14, further comprising:

receiving at the first social network service a third comment from a third social network service, wherein the third comment is different than the first comment and the second comment; and presenting the third comment with the first content item.

17. The method according to claim 14, wherein presenting the second comment with the first content item includes presenting a name associated with the second social network service or an identifier associated with the second social network service.

18. The method according to claim 1, wherein the attribute from the first social network includes likes associated with the first content item from the first social network.

19. The method according to claim 1, wherein the attribute from the second social network includes thumbs up associated with the first content item from the second social network.

20. The method according to claim 1, wherein the attribute from the first social network and the attribute from the second social network includes one or more attributes selected from the list comprising: a score, a like count, an dislike count, a thumbs up count, a thumbs down count, and a view count.

* * * * *